UNITED STATES PATENT OFFICE.

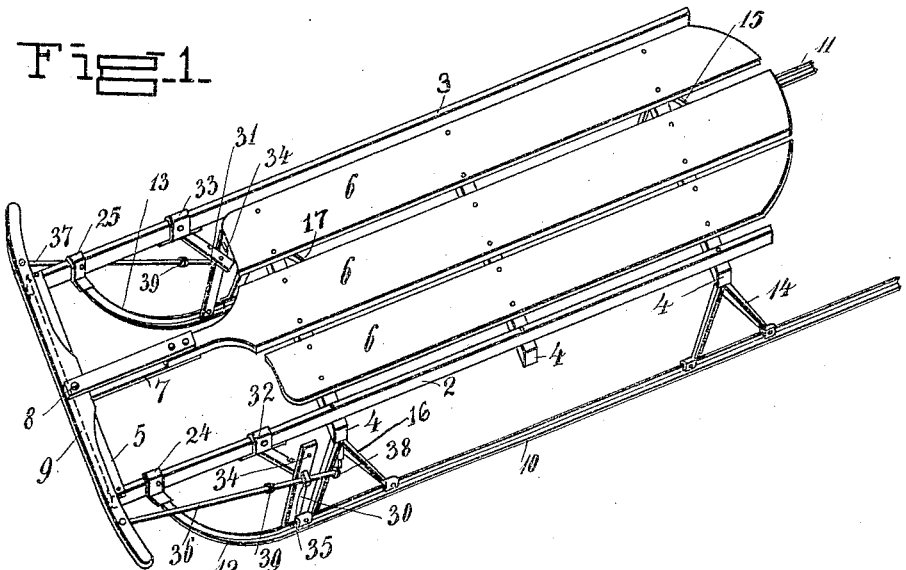

MAURICE WALKER, OF NEW YORK, N. Y.

DEPRESSIBLE-RUNNER DIRIGIBLE SLED.

940,221.

Specification of Letters Patent.  Patented Nov. 16, 1909.

Application filed August 28, 1909.  Serial No. 515,024.

*To all whom it may concern:*

Be it known that I, MAURICE WALKER, a citizen of the United States, and a resident of the borough of Manhattan, county, city, and State of New York, have invented certain new and useful Improvements in Depressible - Runner Dirigible Sleds, as set forth in the following specification.

This invention relates to dirigible sleds, particularly to those used for coasting.

An object of the invention is to provide for the positive steering of the sled without materially retarding its progress and also to provide artificial banking for the sled to facilitate the taking of sharp turns. To this end the applicant desires to do away with the application to the road bed of any braking element as used heretofore for deflecting the direction of a sled's progress.

It is a further object of the invention to improve the general construction of such a dirigible sled with particular regard for minimizing the number of parts and increasing the reliability of the structure under the operating conditions.

To the above end there is contemplated a sled construction comprising, any suitable body frame-work having mounted on it a single pair of depending side runners, preferably upturned at their forward ends, normally providing upwardly curved parallel runner treads, each runner being secured against lateral movement relatively to the frame-work but so mounted as to be depressed below its normal position relatively to the sled (which does not mean that every portion of the runner need of necessity be depressed but that a material portion thereof be depressed) to elevate the corresponding side of the sled and tilt both runners relatively to the road bed, whereby the application of a laterally curved tread to the road bed is effective together with an artificial bank for guiding the sled; and positively acting means, in the form of toggles operated by a cross lever, for depressing each of the runners selectively.

The above and further objects of the invention will be set forth more in detail in the following claims and will be apparent from the following description, which should be read in connection with the accompanying drawings, which form part of this application, in which like characters designate corresponding parts, and in which,—

Figure 1 is a perspective view of the sled construction with the runners in normal position; Fig. 2 is a side elevation of the construction shown in Fig. 1; Fig. 3 is a view corresponding to Fig. 2 with parts broken away but showing the left hand runner depressed; Fig. 4 is an enlarged detail cross section taken through line IV—IV of Fig. 2 looking in the direction of the arrows; and Fig. 5 is a detail view showing the forward bracket construction.

In the drawings the body framework 1 is shown comprising side bars 2 and 3 extending from front to rear and cross connected by cross bars 4 secured beneath the side bars 2 and 3 and by the forward cross bar 5 secured above the side bars 2 and 3. The frame work may be covered by any suitable flooring 6, to which the cross bar 5 may be stayed by the straps 7 to reinforce the fulcrum 8 for the cross bar operating lever 9.

10 and 11 indicate side runners of ordinary construction preferably T angle steel having upturned forward portions 12 and 13.

The rear portions of the runners are provided respectively with forked brackets 14 and 15 suitably secured to the webs of their respective runners as by rivets and also suitably secured to the rear cross bar by bolts or rivets, it being understood that this construction (the brackets being preferably of sheet metal) rigidly secures the runners to the framework against lateral movement but permits a relative downward depression of the forward part of the runner due to the resilience of the connecting parts.

The forward portions of the runner are provided respectively with forked brackets 16 and 17 provided at their top with horizontal seats 18 to rest against the under side of a forward cross bar 4 and having a downward extension 19 laterally braced by buttress ribs 20 and providing sliding bearings 21 for the slip pins 22 and (23 not shown) firmly mounted in and downwardly projecting from the said cross bar 4.

Secured to the forward portions of the side bars 2 and 3 are guiding clips 24 and 25 providing spaced lips 26 for slidably engaging the opposite faces of the web portion 27 of the forward upturned end of each runner which, when in normal position, may protrude into a guiding slot 29 formed in the forward portion of each of the side bars 2 and 3.

Selective means for depressing the forward end of each of the side runners is embodied in the toggles 30 and 31 pivoted at their lower ends to the respective webs of the runners and at their other ends to the cross bars 2 and 3 by means of bearings 32 and 33. Each toggle is prevented from passing the dead center by means of a pin 34. Through the medium of lugs 35 they are operated respectively by lost motion links 36 and 37, pivoted to the ends of the cross bar lever 9 and playing through the lugs 35 between stops 38 and 39.

As indicated, each runner is normally arranged parallel to the other and they are both constrained to move only in their respective parallel planes. Figs. 1, 2 and 4 show the normal position of the parts.

In the event that it is desired to deflect the sled's course to the right the operating cross lever 9 is rotated into the position shown in Fig. 3 causing the link 36 to be drawn forward until the stop 38 engages the lug 35 of toggle 30, which is forcibly spread to depress the forward portion 12 of the runner 10 and lift the corresponding side of the sled and tilt both runners to the right relatively to the road bed, the runner 10 substantially pivoting about the rear cross bar 4 while the sliding connection 19, 22 permits the depression of the forward portion 12 of the runner but prevents all lateral movements of the same relatively to the framework 1, while the clip 24 guides the upturned forward end of the runner 10 in its downward movement. The degree of deflection for the sled may be regulated by the amount the runner is depressed. Deflection of the sled's course to the left is effected by depressing the right hand runner 11 in a similar manner, in which event the lost motion connection 36 rides through the lug 35 without actuating the toggle except that the stop 39 positively insures the breaking of the toggle 30 into its normal position shown in Figs. 1 and 2. Although a satisfactory embodiment of the invention has been illustrated and described, it is to be understood that modifications of the detail construction are contemplated by the accompanying claims.

What is claimed and what is desired to be secured by United States Letters Patent is:—

1. In a dirigible sled, a body framework; a single pair of parallel side runners movably secured to said framework; and means for selectively depressing each of said runners to elevate the corresponding side of the sled and tilt the sled toward the other side.

2. In a dirigible sled, a body framework; a single pair of parallel side runners; means securing said runners to said framework and preventing upward and lateral movements of said runners but permitting downward movement thereof relatively to said framework; and means for selectively depressing each of said runners to elevate the corresponding side of the sled and tilt the sled toward the other side.

3. In a dirigible sled, a body framework; a single pair of parallel side runners upwardly curved at their forward ends and movably secured to said framework; and means for selectively depressing each of said runners to elevate the corresponding side of the sled and tilt the sled toward the other side.

4. In a dirigible sled, a body framework; a single pair of parallel side runners upwardly curved at their forward ends; means securing said runners to said framework and preventing upward and lateral movements of said runners but permitting downward movement thereof relatively to said framework; and means for selectively depressing each of said runners to elevate the corresponding side of the sled and tilt the sled toward the other side.

5. In a dirigible sled, a body framework; a single pair of parallel side runners upwardly curved at their forward ends; brackets securing said runners at the rear to said framework against lateral movement but permitting a downward rotation of each runner in its own plane; brackets secured to the forward ends of said runners and each comprising a sliding connection with the said framework to permit a downward movement of the forward portion of each runner but to prevent upward and lateral movements of the same; and means for selectively depressing the forward portion of each of said runners.

6. In a dirigible sled, a body framework; a single pair of parallel side runners upwardly curved at their forward ends; brackets securing said runners at the rear to said framework against lateral movement but permitting a downward rotation of each runner in its own plane; brackets secured to the forward ends of said runners and each comprising a sliding connection with the said framework to permit a downward movement of the forward portion of each runner but to prevent upward and lateral movements of the same; a guiding clip slidably engaging the upturned forward end of each runner; and means for selectively depressing the forward portion of each of said runners.

7. In a dirigible sled, a body framework; a single pair of parallel side runners upwardly curved at their forward ends; brackets securing said runners at the rear to said framework against lateral movement but permitting a downward rotation of each runner in its own plane; brackets secured to the forward ends of said runners and each comprising a sliding connection with the said framework to permit a downward movement of the forward portion of each runner but to prevent upward and lateral movements of the same; and means for selectively depressing the forward portion of each of said runners comprising a toggle connected between each runner and said framework and lost motion links connecting said toggles with a cross lever fulcrumed to said framework.

8. In a bob sleigh or sled, a framework; a single pair of upwardly curved runner members mounted on said frame work and each having independent connection therewith, whereby each runner member may be forced down to lift the corresponding side of the framework, tilt the said runner member relatively to the road bed and thereby guide the sled.

In witness whereof, I have signed my name to this specification, in the presence of two subscribing witnesses.

MAURICE WALKER.

Witnesses:
LEONARD DAY,
GEORGE S. LUDLOW.